United States Patent [19]

Pedone

[11] 4,031,839

[45] June 28, 1977

[54] REUSABLE OIL ABSORBENT BILGE AND FUEL TANK OPENING PADS

[76] Inventor: Vito S. Pedone, Box 2733, Arlington, Va. 22202

[22] Filed: May 19, 1976

[21] Appl. No.: 687,942

[52] U.S. Cl. .................... 114/270; 114/183 R; 210/DIG. 26; 210/242 AS

[51] Int. Cl.² ........................... B63B 35/00

[58] Field of Search .......... 114/.5 R, .5 RC, 183 R; 115/.5 R; 139/426 R; 210/DIG. 26, 40, 73 W, 242 AS

[56] References Cited

UNITED STATES PATENTS

| | | | |
|---|---|---|---|
| 2,903,021 | 9/1959 | Holden et al. | 139/426 R |
| 3,052,268 | 9/1962 | Seney et al. | 139/426 R |
| 3,494,862 | 2/1970 | Horowitz | 210/40 |
| 3,537,587 | 11/1970 | Kain | 210/242 |
| 3,657,125 | 4/1972 | Strickman | 210/40 |
| 3,679,058 | 7/1972 | Smith | 210/DIG. 26 X |
| 3,702,657 | 11/1972 | Cunningham et al. | 210/242 |
| 3,739,913 | 6/1973 | Bogosian | 210/242 |
| 3,852,193 | 12/1974 | Jakubek et al. | 210/73 W |
| 3,870,008 | 3/1975 | Wilkerson | 114/183 R X |
| 3,888,766 | 6/1975 | Young | 210/DIG. 26 X |
| 3,904,528 | 9/1975 | Yocum | 210/40 X |

Primary Examiner—Trygve M. Blix
Assistant Examiner—Sherman D. Basinger
Attorney, Agent, or Firm—Beall & Jeffery

[57] ABSTRACT

For removing oil from the bilge area and fuel tank filler area of a boat, an oil absorbent pad is constructed with an outer wide mesh structural envelope confining and reinforcing an inner containment envelope of woven synthetic crepe material that will absorb oil with a wicking action while repelling water and which will contain therein granular open pore synthetic foamed resin capable of absorbing and retaining the oil without leaking. Pads are provided in the bilge area of boats to act alone or in combination with bilge pump filters, and they are provided as a ring around the fuel tank filler opening to prevent spillage during the taking on of fuel by the boat.

15 Claims, 12 Drawing Figures

REUSABLE OIL ABSORBENT BILGE AND FUEL TANK OPENING PADS

BACKGROUND OF THE INVENTION

The present invention relates to a system for removing the oil from the surface of water from the bilge area and elsewhere of recreational boats and small commercial vessels. The system will allow the bilge pump to discharge water overboard ranging from a minimum of oil to water free of oil. This in turn will prevent pollution of the environment.

The system can also be applied to absorbing oil from the surface of the water being processed in small industrial plant oil wastes, oil slicks or oil spills that may result from maritime oil spill incidents.

The Federal Water Pollution Control Act (FWPCA) prohibits the discharge of oil or hazardous substances into the water of the United States. This prohibition is stated with respect to these terms: "discharge" includes spilling, leaking, pumping, pouring or dumping; and "oil" means any kind of oil in any form, including fuel oil, gasoline, lubricating oil and oil mixed with water in a vessel's bilge. The standard further states that oil has been discharged in a harmful quantity if it causes a rainbow, a film, a sheen or discoloration upon the surface of the water.

At the present time, vessels with inboard engines commonly have bilges that collect water, fuel oil, gasoline, and lubricating oil. For safety purposes most vessels have an automatic bilge pump to pump the excessive mixed oily water overboard to avoid flooding. Further, prior to starting of the engine and during the operation of an engine, the bilge pump is periodically operated to further remove the combination of the bilge oil and water. Commonly, this will result in the discharge of a harmful quantity of oil as determined by the above standards.

One way that has been suggested to meet the above standards is to provide a holding tank within the boat, into which the oily bilge water is pumped during the operation of the bilge pump, so that the oily bilge water can further be pumped to an onshore system.

Large oil water separators have been provided for large ships, but the size and cost of these systems generally prohibit their use on recreational boats and small commercial vessels of the type described above. Further, such systems are mainly concerned with recovering bulk oil and not removing the small quantities of oil. These systems are incapable of meeting the above standards.

Smaller sized oil water separators for removing small quantities of oil from the water are becoming available to recreational boat and small commercial vessel operators, for example as shown in U.S. Pat. No. 3,913,513. While these bilge pump oil filters meet the standards set forth above and usually have an operating life cycle of six to twelve months, they have the following limitations such as: a, space available in the hull for the canister, b, whether the boat is operated on limited basis or on daily operations such as charter fishing boats and c, the operating condition of the engine. While these bilge pump oil filters can satisfy the regulation for discharging oily bilge water, free of oil, their length of operation is subjected to many variables.

Gasoline and diesel oil are also discharged into the enviroment when the boats take on fuel and there is leakage in the vicinity of the filling nozzle and fuel tank filler opening. This leakage falls directly into the water or indirectly as run-off from the deck.

SUMMARY OF THE INVENTION

The present invention relates to a system for removing the oil with absorbing pads or blankets from the surface of water from the bilge area of recreational boats and commercial vessels and from the vicinity of the fuel tank filler opening. The system will allow the bilge pump to discharge water overboard ranging from a minimum of oil to water free of oil. This in turn will prevent pollution of the environment.

The present invention can extend the operation time cycle of the bilge pump oil filter. When a reusable absorbent pad is placed in the bilge area it will absorb most of the oil leaving the remaining minimal oil to be filtered out by the bilge pump oil filter-free of oil. The pad can further compliment these bilge pump oil filters in the even of engine breakdown causing a large amount of oil to be drained into the bilge area. The mopping up of this oil will eliminate the unnecessary saturation of the filter. When the reusable absorbent pad becomes saturated with oil, the pad can be wrung out and continued to be used over and over again by either absorbing the oil directly or from the surface of the water. After many applications, the absorbent pad can be cleaned further by washing it in hot soapy water followed by a clean water rinse. The pad can then either be wrung out or hung up to dry.

Additional use of the absorbent pad is to "mop up" and eliminate any oil/gasoline that might spill or drain, e.g. in the bottom of the outboard motorboat.

The reusable absorbent pad is constructed of an inner and outer bag lining in which absorbent filter material is contained in the inner bag. The outer material is constructed out of a porous wide mesh, preferably rough nylon netting for structural strength. Besides providing strength, the outer mesh material allows for the attachment of grommets so that the pad can be secured in the bilge area and not be snagged by any moving gear. Since the absorbent pad will absorb 20 to 30 time its own weight, the grommets will allow the pads to be easily retrieved.

The inner bag material, like the outer material and the absorbent filler material, repels water and in addition has the characteristics of causing a "wicking" action with the oil without saturating, e.g. 100% polyester crepe material which has a capillary action for hydrocarbon oil. Other synthetic material or cotton has a tendency to become quickly saturated when it comes in contact with oil and stops the "wicking action" in moving the oil to the absorbent filler material inside the bag.

The reusable absorbent pad is provided with alternate layers of large (10,000 to 5,000 microns), medium (5,000 to 2,000 microns) and small (less than 2,000 microns) particles of expanded synthetic resin material. It has been found that the combination of the different sized particles allow for quick and even saturation of the pads. Using only small sized particles provides an absorption rate that is high, but the saturation is uneven and sometimes the oil never reaches the center. Using large particles only, the saturation rate is faster, but the amount of saturation is lower. The synthetic resin material that is chosen for the particles is preferably expanded polyurethane that picks up between 50 to 70 times its weight in oil without materially changing in size. With the absorbent material being confined within the bag, this maintains particle orientation and size while picking up oil and is extremely important. The material is also non-leaching so that regardless of the passage of time, the oil will not return to the water after it has been absorbed by the resin. Also, the material does not significantly change in size or composition when mixed with oil, even to the point of saturation and this material is non-toxic so that no adverse chemicals are added to the water that is discharged from the boat. While being oleophilic, the material is hydrophobic due to the difference in surface tension between oil and water with respect to the pores of the expanded resin.

As one method of constructing the filter material, polyurethane is expanded to form a rigid foam according to a conventional process, and thereafter a Pullman type of cutting mill, which is a knife mill employing three sharp rotating blades, is used to chop the rigid polyurethane foam into small granules or particles, which are thereafter passed through screens to obtain the large, medium and small particles. Grinding or crushing to obtain the particles will result in closed cell particles because grinding will produce sufficient heat to heat seal or self-skin the cells, even though the cells are reduced in size and crushing will merely reduce the size of closed cells without opening them up. In contrast, cutting of a closed cell will open up one wall of the cell for free access of oil to the interior of the cell and greatly increase the surface area of the resin exposed to the oil. It has been found that the preferred range of particle size is from (powered size) microns to about 10,000 microns. It has been found that when an expanded rigid synthetic resin has been processed according to the present invention through a Pullman cutter mill with sharp blades, it will absorb approximately 400% more oil than processed through a grinder to produce the same size particles. A physical examination of the cross section of cut material according to the present invention will show the cut face exposes an undistorted cell interior. The resulting particles have a density of approximately 3 pounds per cubic foot.

The absorbent pads are constructed in various sizes for correspondingly different sized boats, to be placed within the bilge area for absorbing the oil as it is collected in the bilge area. The oil absorbed in the pads will not leach out over extended periods of time and further is very difficult to ignite. Also, these pads may be formed with a central opening to overlie the filler opening of a fuel tank during the taking on of fuel by the boat so that any spilled fuel during filling or fuel dripping from the nozzle during removal of the nozzle will be quickly absorbed by and retained with the pad. Thus, the deck, bilge area and adjacent water will not become contaminated.

DETAILED DESCRIPTION OF THE DRAWINGS

FIG. 4 is an enlarged cross-sectional view taken along line N—IV of FIG. 1a;

DETAILED DESCRIPTION OF THE PREFERRED EMBODIMENTS

As shown in FIG. 1, the pad within the bilge area is generally flat and rectangular, with its size varying according to the size of the boat. The pad of FIG. 1a would be approximately 12 × 24 inches, the pad of FIG. 1b would be approximately 12 × 12 inches, and the pad of FIG. 1c would be approximately 24 × 24 inches. The pad of FIG. 1d is installed around the filler opening of the fuel tank and is approximately 14 inches in diameter with a central 2 inch hole.

Figure 2:
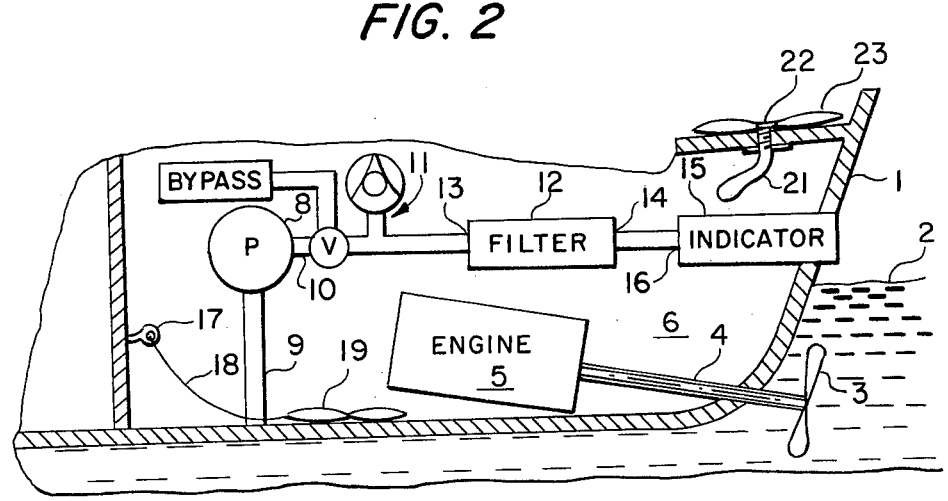
FIG. 2 is a schematic side cross-sectional view through the bilge area of a conventional small boat showing the pads of the present invention during usage and in combination with the boat.
Figure 3:
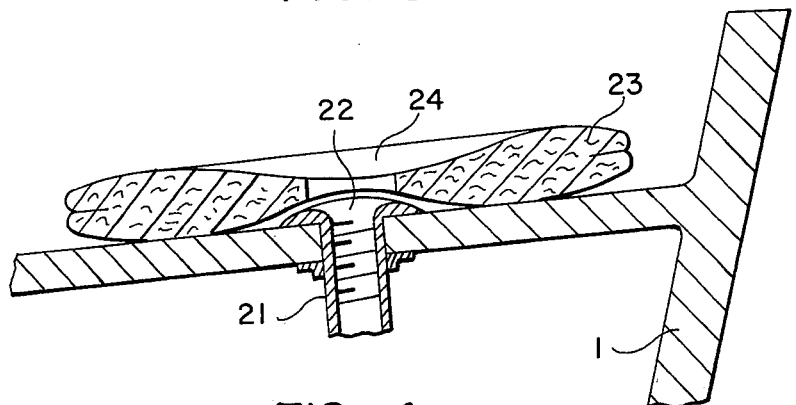
FIG. 3 is a enlarged partial cross-sectional view of a portion of FIG. 2.

In FIG. 2 there is shown a boat with the bilge pump filtration system of the above mentioned U.S. Pat. No. 3,913,513. The small boat includes a hull 1 that extends partially above the water line 2 and partially below the normal water line. For propulsion of the boat, there is a driven propeller 3 below the water line, which is drivingly connected to a drive shaft 4 that passes through the hull 1 and is connected at its inboard end to an inboard engine 5. The engine 5 is mounted within an engine compartment 6, which in the particular example of a boat design is formed by the hull 1 and a partition 7. In a conventional manner, bilge water and oil from the engine is collected at the bottom of the engine compartment 6, which oil may be obtained from bearing grease, engine lubricating oil leakage, gasoline leakage, and the like. In a conventional small boat, the bilge water and oil is pumped overboard by a bilge pump prior to starting the engine, to remove the hazards of an explosion or fire caused by ignition of the oil that is mixed with the bilge water, and further the bilge pump is conventionally operated whenever needed to remove bilge water and oil during operation of the engine.

According to the above mentioned patent, the bilge pump 8 has an inlet connected to an inlet pipe 9 that extends from the bilge pump 8 to closely adjacent the lowermost portion of the engine compartment, so that the bilge pump 8 may suck bilge water and oil into the pump and discharge the same at a high pressure through a pump outlet 10. The pump outlet is fluid connected to a pressure relief valve 11. After leaving the vicinity of valve 11, the pumped high pressure bilge water passes through the inlet 13 of a filter 12, where oil is removed, and then exits through the outlet 14 for passage through the inlet 16 of the indicator 15 that will show saturation of the filter.

According to the present invention, a securement means such as an eye 17 screwed into the partition 7 and a cable 18 secured at one end to the eye 17 and at its opposite end to a grommet of the pad, will hold the absorbent pad 19 of the present invention within the bilge area and prevent it from engaging with the gears or other moving parts within the bilge area. The pad is shown more clearly in FIGS. 1a–1c with the above mentioned securement grommet 20.

Figure 1A:
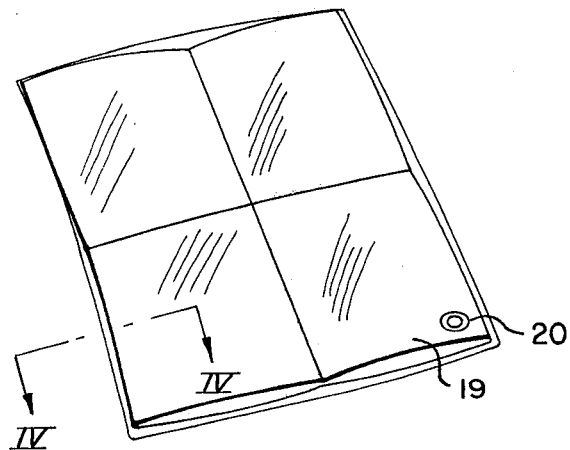
FIG. 1a is a perspective view of one embodiment of the present invention.
Figure 1B:
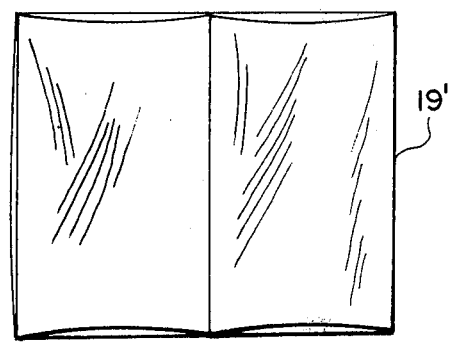
FIG. 1b is a perspective view of a second embodiment of the present invention.
Figure 1C:
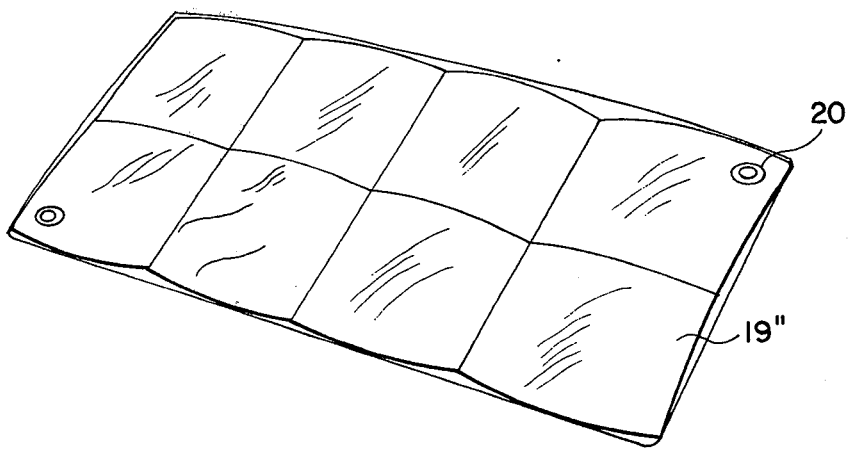
FIG. 1c is a perspective view of a third embodiment of the present invention.
Figure 1D:
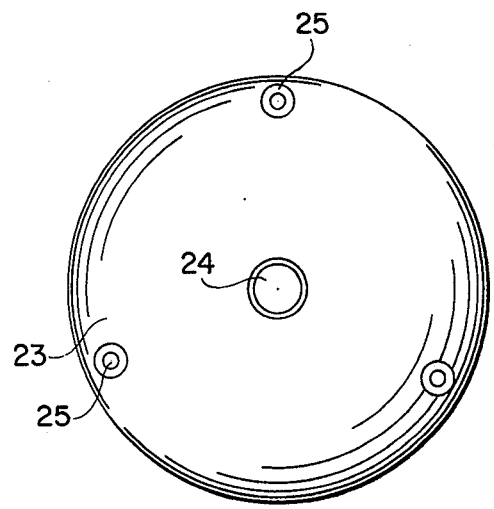
FIG. 1d is a perspective view of a fourth embodiment of the present invention.

The boat further has a fuel tank (not shown) that is filled by means of a filling pipe 21 having a filling opening 22 passing through the deck or hull of the boat. According to the present invention, an absorbent pad 23 (more clearly shown in FIG. 1d) is secured around the filling opening 22 to absorb any fuel spill during filling and further to absorb the fuel that will drip from the nozzle that is removed from the fuel filler opening 22. As shown in FIG. 1d, the pad 23 is provided with a central opening 24 that is approximately the size of the filler opening and which will be aligned with the filler opening for passing therethrough the nozzle prior to the nozzle passing into the filler opening. A plurality of grommets 25, for example 3, may be used to fixedly secure the absorbent pad 23 with the openings 22 and 24 aligned, or the fuel nozzle extending through these two openings may be employed for this purpose. Further, the grommets may be used to attach a line to prevent the pad from falling overboard or becoming lost.

Figure 4:
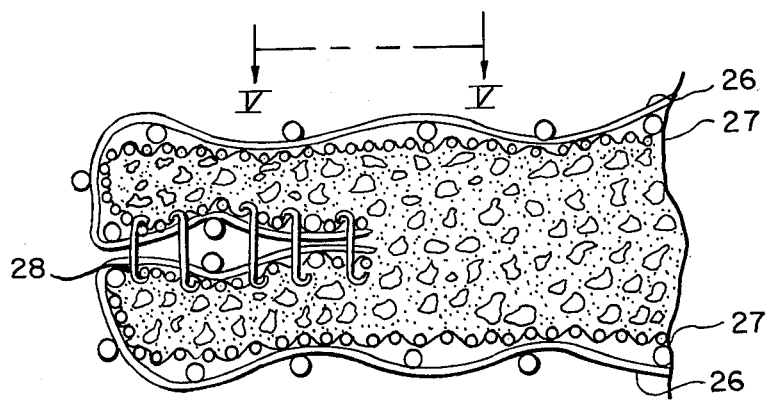
Figure 7:
FIGS. 7, 8 and 9 are respective perspective views of the large, medium and small sized oil absorbing particles (in approximately actual size) that are contained within the pad.
Figure 8:
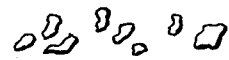
Figure 9:

A typical cross-section of one side of any one of the pads 19, 19', 19', and 23 is shown in FIG. 4. According to the preferred method of constructing the pads, the inner and outer envelopes 26, 27 are sewn together around all but one side in overlaying fashion with stitching 28, and then the thus formed envelope is turned inside out so that the seam employing the stitching 28 will be as shown in FIG. 4. Thereafter, the filling material of FIGS. 7–9 is inserted within the thus formed envelope and the last side is closed by conventional stitching after the edges have been turned over for reinforcement. In forming the layers before stitching, the materials are cut with heated knives so that the synthetic resin that forms the envelopes 26 and 27 will be heat sealed along its edges to prevent unravelling of the woven fabric.

Figure 5:
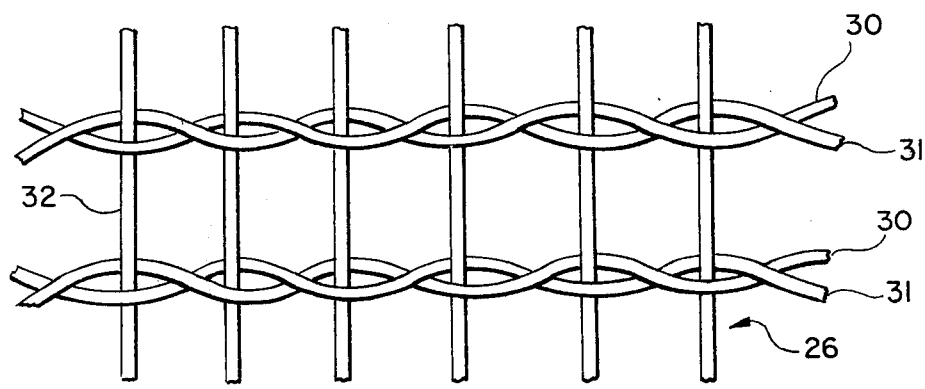
FIG. 5 is a view of only the outer mesh material taken on line v—V of FIG. 4.

Preferably, the outer envelope 26 is constructed of wide mesh rough nylon netting having good structural strength and providing free passage of water and oil in either direction across its surface. As shown in FIG. 5, the outer envelope material 26 is provided with a plurality of rough nylon strands 29 that are generally parallel to each other and straight. Interlocked with the strands 29, there are twisted strands 30, 31 that are tightly locked by the twisting with the strands 29 to provide a stable opened mesh fabric, wherein the interstices or mesh openings 32 are many times greater in width and height than the diameter of the strands 29, 30, 31.

The inner bag or envelope 27 is formed of an absorbent filler material, which will repel water and which additionally has the characteristic of causing a wicking action with respect to the oil, so that it will draw oil from the outside of the envelope towards the inside of the envelope. The material of envelope 27 is preferably 100% polyester crepe material, which has a capillary action for hydrocarbon oil. As can be seen from FIG. 6, this material is woven with generally straight parallel strands 33 and highly crinkled strands 34 to provide a rough surfaced closely woven tight material. Closely woven refers to the fact that the interstices between the threads will be substantially less than the diameter of the threads themselves, and the crepe appearance will be due not only to the crinkled nature of the threads 34 (and also perhaps the threads 33 if desired), but also due to the looseness of the threads 34.

Within the envelopes 26, 27, there is contained alternate layers of large (FIG. 7), medium (FIG. 8) and small (FIG. 9) particles of expanded resin material. All of these particles are preferably expanded or foamed polyurethane that will pick up between 50 to 70 times its weight in oil without materially changing in size and without leaching. This particular material will not pass through the inner bag 27, and the inner bag 27 will prevent the passage of water to the interior of the envelope while wicking or drawing the oil from the exterior of the envelope to the interior of the envelope where it will be absorbed by the particles of FIGS. 7–9.

The grommets 20, 25 are preferably metal ring conventional type grommets that will provide reinforcement for the attachment of lines or the like to secure the pads in place or to prevent them from passing overboard or into moving machinery.

Figure 6:
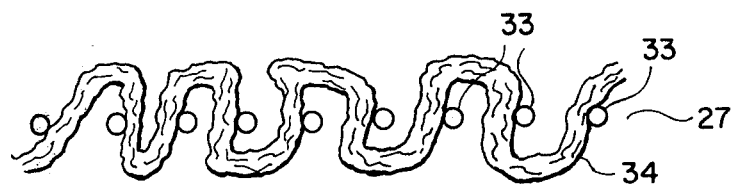
FIG. 6 is an end view of the crepe material forming the inner envelope as seen looking from the right of FIG. 4.

With respect to the pad 23 of FIG. 1d and FIG. 2, an enlarged cross-section would be substantially identical to that shown and described with respect to FIG. 4, and accordingly the outer and inner envelopes would be constructed of material shown and described with respect to FIGS. 5 and 6, respectively.

While preferred embodiments of the present invention have been shown and described in detail for purposes of illustration and for the advantages of their details, further embodiments, modifications and variations are contemplated according to the broader aspects of the present invention, all as determined by the spirit and scope of the following claims.

What is claimed is:

1. A method for removing hydrocarbon oil and its products from the bilge of a boat having an internal combustion engine contaminating the bilge area with the hydrocarbon oil and products to avoid contaminating the environment of the boat with such products, comprising the steps of: containing a particulate mass of expanded open pore oleophilic and hydrophobic synthetic resin within a generally flat envelope of woven oleophilic and hydrophobic synthetic resin fibers having interstices between the fibers substantially smaller than the particules; placing the envelope and contained particle mass within the bilge area of the boat in contact with the oil and bilge water; passing the oil through the envelope with a wicking action and absorbing the oil with the particulate mass within the envelope while generally preventing passage of water through the envelope to its interior; providing a generally centrally arranged passage through the envelope and particulate mass with the side walls of the passage sealed to prevent removal of the particulate mass; aligning the passage concentrically with the fuel tank filler opening of the boat, and thereafter placing a fuel filling nozzle through the passage and into the fuel tank filler opening and passing fuel through the nozzle into the fuel tank so that spilled fuel during filling and withdrawing of the nozzle will be directly engaged by the envelope and absorbed by the particulate mass.

2. The method of claim 1, including the step of tethering the envelope and contained mass to the hull of the boat out of reach of mechanical moving parts within the bilge area.

3. The method of claim 1, further including compressing the envelope and contained particulate mass by wringing the envelope to squeeze absorbed oil out of the envelope after it has become substantially saturated so as to rejuvenate the particulate mass for absorbing more oil; and thereafter replacing the envelope and contained particulate mass in the bilge area of the boat.

4. A device for absorbing oil on board a boat where the oil has been spilled and would otherwise contaminate the environment, comprising: an outer structural envelope of synthetic resin cords interlocked in a mesh having interstices many times larger than the diameter of the cords; an inner envelope with said outer envelope and constructed of oleophilic and hydrophobic synthetic resin fibers closely woven with interstices between the fibers smaller than the diameter of the fibers; a mass of particulate expanded open pore oleophilic and hydrophobic synthetic resin particles contained within said inner envelope and being of a particle size substantially smaller than the interstices of said outer envelope and substantially larger than the interstices of said inner envelope; said inner envelope being means to repell water and prevent passage of water through the inner envelope to the interior of the inner envelope while freely passing oil to the interior of the envelope to be absorbed by the particulate mass through a wicking action of the inner envelope; said inner and outer envelopes being of substantially the same size and shape with said inner envelope being slightly smaller to nest within said outer envelope; each of said inner and outer envelopes being constructed of upper and lower sheets secured together around their entire common periphery to form a flat compound envelope of a size and weight with said mass saturated with absorbed oil, so that they may be easily handled by an average boat operator.

5. The device of claim 4, wherein said inner envelope has at least one half of its said fibers crinkled and loosely woven to form a crepe material.

6. The device of claim 5, wherein fibers of said inner envelope are polyester.

7. The device of claim 5, wherein said outer envelope is constructed of nylon cord, with one set of parallel cords, and a second set of twisted cords generally perpendicular to said first set and arranged in pairs on respective sides of said interstices, with said pairs each being twisted between adjacent parallel cords and passing on opposite sides of each of said parallel cords to interlock with said parallel cords.

8. The device of claim 4, wherein said outer envelope is constructed of nylon cord, with one set of parallel cords, and a second set of twisted cords generally perpendicular to said first set and arranged in pairs on respective sides of said interstices, with said pairs each being twisted between adjacent parallel cords and passing on opposite sides of each of said parallel cords to interlock with said parallel cords.

9. The device of claim 4, including said inner and outer envelopes being torroidal shaped with a common generally centrally arranged through passage of a size and shape complimentary to the standard filler opening for a boat fuel tank so as to be aligned with the filler opening during the filling of the fuel tank to pass therethrough the fuel nozzle and to be directly contacting for absorbing the fuel that is leaked during filling and withdrawal of the nozzle.

10. The device of claim 9, wherein said inner envelope has at least one half of its said fibers crinkled and losely woven to form a crepe material.

11. The device of claim 10, wherein said outer envelope is constructed of nylon cord, with one set of parallel cords, and a second set of twisted cords generally perpendicular to said first set and arranged in pairs on respective sides of said interstices, with said pairs each being twisted between adjacent parallel cords and passing on opposite sides of each of said parallel cords to interlock with said parallel cords.

12. The device of claim 9, in combination with a small boat having an inboard engine driving an outboard propeller, a hull, a fuel tank within said hull having a filling opening passing through said hull; and said torroidal inner and outer envelopes surrounding said filling opening to provide access to said fuel tank by a fuel filling nozzle only through the generally central passage of said envelopes.

13. The device of claim 4, wherein said particulate mass is a layered mass, with a first layer of powdered expanded open pore synthetic resin and a second layer of expanded open pore synthetic resin having particle size substantially larger than said first layer and larger than 2,000 microns.

14. The device of claim 4, wherein the outer periphery of said envelopes are joined together with a seam internally of said envelopes formed by a reverse bend of sheet material forming both said inner and outer envelopes, with said seam comprising outer layers of said inner envelope material and two inner layers of said outer envelope material directly contacting each other in stacked relationship and secured together by stitching.

15. The device of claim 4, in combination with a small boat having an inboard engine driving an outboard propeller, with the engine being contained within a compartment collecting bilge water and oil from the engine; pump means connected to said inlet means for sucking bilge water and oil through said inlet means and discharging it at a higher pressure; filter means connected to said pump means for receiving the pressurized bilge water and oil, and further for normally removing the oil from the bilge water to discharge only the bilge water; discharge means connected to said filter means for receiving the filtered bilge water and discharging the filtered bilge water outside of said engine compartment to the environment surrounding the small boat; and means tethering the inner and outer envelopes with contained particulate mass in the bilge water compartment in contact with the bilge water and restained from engaging with any mechanically moving parts within the compartment.

* * * * *